United States Patent [19]

Kashihara et al.

[11] Patent Number: 5,064,923
[45] Date of Patent: Nov. 12, 1991

[54] CROSSLINKED POLYMER MICROPARTICLES DERIVED FROM BETAINE MONOMERS HAVING THREE-DIMENSIONAL NETWORK

[75] Inventors: Akio Kashihara, Hirakata; Keizou Ishii, Ashiya; Kazunori Kanda, Yao; Ryuzo Mizuguchi, Yawata, all of Japan

[73] Assignee: Nippon Paint Co., Ltd., Osaka, Japan

[21] Appl. No.: 325,183

[22] Filed: Mar. 17, 1989

Related U.S. Application Data

[63] Continuation of Ser. No. 54,924, May 28, 1987, abandoned.

[30] Foreign Application Priority Data

May 30, 1986 [JP] Japan ................................ 61-126558

[51] Int. Cl.$^5$ ..................... C08F 226/06; C08F 228/02
[52] U.S. Cl. .................................... 526/265; 526/287; 526/304; 526/312
[58] Field of Search ................ 526/265, 287, 304, 312

[56] References Cited

U.S. PATENT DOCUMENTS

| | | | |
|---|---|---|---|
| 3,411,912 | 11/1968 | Dykstra | 526/287 |
| 4,205,152 | 5/1980 | Mizuguchi | 526/265 |
| 4,822,847 | 4/1989 | Schulz | 524/547 |

*Primary Examiner*—Christopher Henderson
*Attorney, Agent, or Firm*—Millin, White & Zelano

[57] ABSTRACT

Polymer microparticles having a three-dimensional network structure and an average particle size of 0.01 to 1 micron are obtained by emulsion polymerization of ethylenically unsaturated monomeric composition containing (a) at least one polyfunctional monomer having a plurality of polymerizable sites, or (b) a combination of two ethylenically unsaturated monomers each bearing mutually reactive functional groups in an aqueous medium in the presence of a compound or resin having a betaine group. The betqine compound or resin is incorporated into the polymer microparticles by physically adhering or covalently binding thereto to enhance the dispensing stability of the microparticles over a wide range of pH.

4 Claims, No Drawings

CROSSLINKED POLYMER MICROPARTICLES DERIVED FROM BETAINE MONOMERS HAVING THREE-DIMENSIONAL NETWORK

This is a continuation of application Ser. No. 07/054,924, filed May 28, 1987, now abandoned.

BACKGROUND OF THE INVENTION

This invention relates to internally crosslinked polymer microparticles having a three-dimensional network structure.

Recently, internally crosslinked polymer microparticles commonly known as polymer microgels have become interested in the coating industry. The provision of high-solids coating compositions has been demanded for social reasons from the viewpoint of saving natural resources and pollution control. Polymer microgels may be effectively used in the preparation of high-solids coating compositions without compromising their workability. Besides high-solids coating compositions, polymer microgels find a wide variety of uses such as adhesives, sealants, optical fiber coverings, printing materials, biomedical materials and the like.

Several methods are known to produce polymer microgels. One such method includes the steps of emulsion polymerizing a mixture of ethylenically unsaturated monomers including at least one crosslinking comonomer in an aqueous medium, and then removing water from the resulting polymer emulsion by, for example, solvent substitution, azeotropic distillation, centrifugation, filtering or drying.

Japanese Patent Application Nos. 56/71864 and 57/13052 disclose an emulsion polymerization method using, as an emulsifier and dispersant, a compound or resin having an amohoionic group of the formula:

$$-\underset{|}{N}-R-Y$$

wherein R is optionally substituted alkylene or phenylene and Y is —COOH or —SO$_3$H. The compound or resin having such amphoionic group will be bound into the polymers constituting microgels physically or through covalent bonds. The use of said compound or resin as an emulsifier and dispersant is advantageous in that it can dispense with the step of subsequently removing emulsifier or dispersant as required when using conventional surfactants which, if remained, will adversely affect properties of coating films. Furthermore, the microgels exhibit a number of advantageous characteristics such as high stability and dispersibility in both aqueous and nonaqueous systems based on the presence of said amphoionic groups.

Experiments have shown, however, that polymer microparticles bearing said amphoionic groups become unstable against pH variation, particularly in acidic ranges. This is because, whereas said amphoionic group serves to increase the stability of polymer dispersions in water in the presence of a sufficient amount of counter ions, such counter ions are entrapped by another compound when pH has varied.

Experiments have also shown that when a compound or resin having said amphoionic group of the formula:

$$-\underset{|}{N}-R-Y$$

is used in the emulsion polymerization to prepare internally crosslinked polymer microparticles, the proportion of polyfunctional crosslinking monomers is usually limited upto 20% of total monomer mixtures. When higher solvent resistance, weatherability, thermal deformation resistance and other physical and chemical properties are desired for microgels, the crosslinking density of microgels must be increased as high as possible by increasing the proportion of the crosslinking monomers to 50–100%.

SUMMARY OF THE INVENTION

It is, therefore, a main object of the present invention to provide internally crosslinked polymer microparticles having a three-dimensional network structure and crosslinking density which are highly stable in a dispersed state irrespective of pH variation.

Other objects and advantages of this invention will become apparent to those skilled in the art as the description proceeds.

According to this invention, there is provided internally crosslinked polymer microparticles having a three-dimensional network structure and an average particle size of 0.01 to 1 micron. Said polymer microparticles have physically adhered or covalently bonded thereto a betaine moiety. Said polymer microparticles are obtained by emulsion polymerization of a monomeric composition containing at least 10% by weight of the monomeric composition of at least one polyfunctional monomer having a plurality of ethylenically unsaturated bonds or a combination of two ethylenically unsaturated monomers each bearing mutually reactive functional groups in the presence of a compound or resin having a betaine group as an emulsifier or dispersant.

The term "betaine" as used herein also includes sulfobetaines. Compounds having a betaine structure may act as a surfactant like corresponding amino carboxylic acids or amino sulfonic acids. However contrary to the latter, they do not undergo a tautomerism but always take an amphoionic form. Therefore, they exhibit a desired level of surface activity in the absence of counter ions independently from pH levels. Accordingly, when polymerizing said monomeric composition in the presence of a compound or resin having a betaine group as emulsifier, the resulting dispersion system and polymer microparticles separated therefrom are stable over a wide pH range.

The resulting polymer microparticles may be advantageously incorporated to, for example various coating compositions for rheology control purposes with increased interaction between polymer microparticles due to the presence of betaine groups.

Because the polymer microparticles are highly crosslinked into a three-dimensional network structure, they exhibit higher physical and chemical properties such as higher solvent resistance, weatherability and thermal deformation resistance.

DETAILED DESCRIPTION

Monomer Composition

Monomer compositions constituting the polymer microparticles of this invention should contain at least 10% by weight of the composition of (a) at least one polyfunctional monomer having a plurality of ethylenically unsaturated bonds or (b) a combination of two ethylenically unsaturated monomers each bearing mutually reactive functional groups. In other words, the monomeric composition may consist of 10 to 100% of (a) or (b), and (c) 0 to 90% of at least one monofunctional ethylenically unsaturated monomer.

Monomers having at least two polymerization sites may typically be represented by esters of a polyhydric alcohol with an ethylenically unsaturated monocarboxylic acid, esters of an ethylenically unsaturated monoalcohol with a polycarboxylic acid and aromatic compounds having at least two vinyl substituents. Specific examples thereof include, ethylene glycol diacrylate, ethylene glycol dimethacrylate, triethylene glycol dimethacrylate, tetraethylene glycol dimethacrylate, 1,3-butylene glycol dimethacrylate, trimethylolpropane triacrylate, trimethylolpropane trimethacrylate, 1,4-butanediol diacrylate, neopentyl glycol diacrylate, 1,6-hexanediol diacrylate, pentaerythritol diacrylate, pentaerythritol triacrylate, pentaerythritol tetracrylate, pentaerythritol dimethacrylate, pentaerythritol trimethacrylate, pentaerythritol tetramethacrylate, glycerol diacrylate, glycerol allyloxy dimethacrylate, 1,1,1-tris(hydroxymethyl)ethane diacrylate, 1,1,1-tris(hydroxymethyl)ethane triacrylate, 1,1,1-tris(hydroxymethyl)ethane dimethacrylate, 1,1,1-tris(hydroxymethyl)ethane trimethacrylate, 1,1,1-tris(hydroxymethyl)propane diacrylate, 1,1,1-tris(hydroxymethyl)propane triacrylate, 1,1,1-tris(hydroxymethyl)propane dimethacrylate, 1,1,1-tris(hydroxymethyl)propane trimethacrylate, triallyl cyanurate, triallyl isocyanurate, triallyl trimellitate, diallyl phthalate, diallyl terephthalate and divinyl benzene.

Combinations of two monomers having mutually reactive groups may be used in place of, or in addition to monomers having two or more polymerization sites. For example, monomers having a glycidyl group such as glycidyl acrylate or methacrylate may be combined with carboxyl group-containing monomers such as acrylic, methacrylic or crotonic acid. Also, hydroxyl group-containing monomers such as 2-hydroxyethyl (meth)acrylate, 2-hydroxypropyl (meth)acrylate, hydroxybutyl (meth)acrylate, allyl alcohol or methallyl alcohol may be combined with isocyanato group-containing monomers such as vinyl isocyanate or isopropenyl isocyanate. Other combinations of mutually reactive groups will be apparent to those skilled in the art and include amine/carboxylic acid, epoxide/carboxylic acid or anhydride, amine/carboxylic acid chloride, alkyleneimine/carboxylic acid, alkoxysilanes, hydroxy/isocyanato and the like.

Examples of monomers having one polymerization site includes:

(1) carboxyl bearing monomers as, for example, acrylic acid, methacrylic acid, crotonic acid, itaconic acid, maleic acid and fumaric acid, (2) hydroxyl bearing monomers as, for example, 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol and methallyl alcohol, (3) nitrogen containing alkyl acrylates or methacrylates as, for example, dimethylaminoethyl acrylate, and dimethylaminoethyl methacrylate, (4) polymerizable amides as, for example, acrylic amide and methacrylic amide, (5) polymerizable nitriles as, for example, acrylonitrile and methacrylonitrile, (6) alkyl acrylates or methacrylates as, for example, methyl acrylate, methyl methacrylate, ethyl acrylate, n-butylacrylate, n-butyl methacrylate, and 2-ethylhexylacrylate, (7) polymerizable glycidyl compounds as, for example, glycidyl (meth)acrylate, (8) polymerizable aromatic compounds as, for example, styrene, α-methyl styrene, vinyl toluene and t-butylstyrene, (9) α-olefins as, for example, ethylene and propylene,

(10) vinyl compounds as, for example, vinyl acetate and vinyl propionate, and

(11) diene compounds, as, for example, butadiene and isoprene.

These monomers are used alone or in combination.

Betaine Compounds Having Polymerizable Unsaturated Group

As a reactive emulsifier, betaine compounds having an ethylenically unsaturated group may be used in the emulsion polymerization of monomers constituting the polymer microparticles of this invention. These compounds are bonded to the polymer microparticles through a covalent bond by a copolymerization reaction with said monomers.

One class of such compounds has the formula:

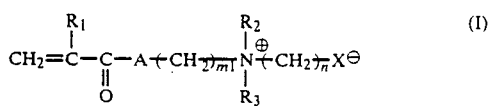

wherein $R_1$ is hydrogen or methyl, $R_2$ and $R_3$ are independently $C_1$-$C_6$ alkyl, A is —O— or —NH—, n is 1-6, ml is 1-12, and $X^\ominus$ is $COO^\ominus$ or $SO_3^\ominus$.

These compounds may be synthesized by reacting corresponding aminoalkyl esters or amides of (meth)acrylic acid with lactones or sultones.

Specific examples are:

3-(N,N-dimethyl-N-methacryloylethyl)-aminopropanesulfonic acid betaine, 3-(N,N-diethyl-N-methacryloylethyl)-aminopropanesulfonic acid betaine, 3-(N,N-dimethyl-N-acryloylethyl)-aminopropanesulfonic acid betaine, 3-(N,N-diethyl-N-acryloylethyl)-aminopropanesulfonic acid betaine, N,N-dimethyl-N-methacryloylethyl-β-alanine betaine, N,N-diethyl-N-methacryloylethyl-β-alanine betaine, N,N-dimethyl-N-acryloylethyl-β-alanine betaine, and N,N-diethyl-N-acryloylethyl-β-alanine betaine.

Another class of polymerizable betaine compounds has the formula:

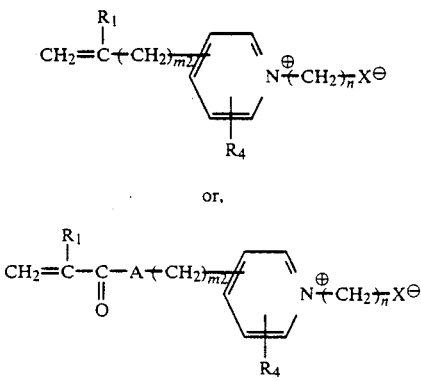

wherein $R_1$, $A$, $n$ and $X^{\ominus}$ are as defined, $R_4$ is hydrogen or $C_1$-$C_3$ alkyl, and m2 is 0, or 1-6.

These compounds may be synthesized by reacting corresponding pyridine compounds with sultones or lactones.

Specific examples include 3-(4-vinylpyridin-1-yl)propanesulfonic acid betaine, 3-(2-vinylpyridin-1-yl)propanesulfonic acid betaine, 3-(4-vinylpyridin-1-yl)propionic acid betaine and 3-(2-vinylpyridin-1-yl)propionic acid betaine.

Resins Containing Betaine Group

Acrylic resins having betaine groups may be prepared by copolymerizing one of polymerizable betaine compounds of the above classes (I) to (III) with monofunctional monomers of classes (1) to (11) as previously described using conventional polymerization methods, e.g. by emulsion or solution polymerization method. Except for the use of polymerizable betaine compounds, the polymerization reaction may be carried out analogously to the method disclosed in Japanese Patent Application No. 56/71864 assigned to the assignee of this application, the disclosure of which is incorporated herein by reference. Preferably, the acrylic resins having betaine groups have a number average molecular weight of 500 to 10,000, more preferably 700 to 6,000.

Polyester resins or alkyd resins having betaine groups may be prepared by the conventional technique for synthesizing these resins using a betaine alcohol as a part of alcohol component constituting the resin backbone. The betaine alcohols may be synthesized, in turn, by reacting a tertiary alkanolamine with a lactone or sultone as disclosed in U.S. Pat. No. 3,505,396. Except for the use of such betaine alcohols, the synthesis of betaine group-containing polyester or alkyd resins may be carried out analogously to those disclosed in Japanese Patent Kokai Nos. 56/34725 and 56/151727 assigned to the assignee of this application, the disclosure of which is incorporated herein by reference.

Modified epoxy resins having betaine groups may be prepared by reacting an epoxy resin terminated with oxirane rings and a reaction product of secondary amine with a lactone or sultone, or by reacting said epoxy resin first with said secondary amine and then with said lactone or sultone. Except for the use of betaine forming reactants, the synthesis of betaine group-containing epoxy resins may be carried out analogously to Japanese Patent Kokai No. 57/40522 assigned to the assignee of this application, the disclosure of which is incorporated herein by reference.

All of the above acrylic, polyester, alkyd and epoxy resins having betaine groups are physically bound to the polymer microparticles of this invention. However, they may be bound to the polymer microparticles through a covalent bond by introducing a polymerizable moiety to produce a reactive oligomer.

Betaine group-containing acrylic resins comprising carboxyl bearing monomers of the above-mentioned class (1) may be reacted with glycidyl methacrylate or glycidyl acrylate of the above-mentioned class (7) to obtain a reactive oligomer.

Betaine group-containing polyester or alkyd resins may also be reacted with glycidyl methacrylate or glycidyl acrylate utilizing remaining free carboxylic function.

Betaine group-containing epoxy resins may be rendered reactive by reacting with free methacrylic acid or acrylic acid utilizing remaining epoxide function.

Emulsion Polymerization

Using the above-described betaine group-containing compounds or resins as an emulsifier, the polymer microparticles of this invention are prepared from the above-described monomer composition by a conventional emulsion polymerization technique in an aqueous medium. Said betaine group-containing compounds or resins are thereby physically adhered or covalently bonded to the resulting polymer microparticles.

The amount of said compounds or resins ranges from 0.5 to 100 parts, preferably from 1 to 50 parts for polymerizable betaine group-containing compounds, and from 0.3 to 400 parts, preferably from 0.5 to 100 parts for betaine group-containing resins per 100 parts of monomer compositions. If this amount is too small, the system is less stable than is desirable. Conversely, excessive amounts tend to impair the water-resistance of microgels or increase the viscosity of the system too high.

The average particle size of resulting polymer microparticles may be controlled by selecting suitable conditions and preferably range 0.01 to 1 micron.

After the polymerization, resulting polymer microparticles may be used for various uses either in the form of an emulsion containing dispersing medium or in a anhydrous form after removing water by solvent substitution, azeotropic distillation, centrifugation, filtration or drying.

The following examples are given for illustrate purposes only. All parts and percentages therein are by weight unless otherwise specified.

REFERENCE EXAMPLE 1

Betaine group-containing acrylic resin

A one liter flask having stirring means, temperature control means, condenser and nitrogen gas inlet pipe was charged with 40 parts of ethylene glycol monomethyl ether and 90 parts of xylene, and heated to 110° C. To this were added dropwise with stirring over 3 hours a solution of 18 parts of N-(3-sulfopropyl)-N-methacryloyloxyethyl-N,N-dimethylammonium betaine in 108 parts of ethylene glycol monomethyl ether and a separately prepared monomer mixture consisting of 103 parts of methyl methacrylate, 78 parts of n-butyl acrylate, 35 parts of 2-hydroxyethyl methacrylate, 16 parts of acrylic acid and 10 parts of azobisisobutyronitrile. After the addition of monomers, a solution of 1 part of t-butylperoxy-2-ethylhexanoate in 10 parts of xylene was added dropwise with stirring over 30 minutes and the reaction continued for 60 minutes at the same temperature. The reaction mixture was evaporated in vacuo to a nonvolatile content of 92% to give an acrylic resin having betaine groups.

REFERENCE EXAMPLE 2

Betaine group-containing polyester resin

A 2 liter flask having stirring means, temperature control means, condenser, decanter and nitrogen gas inlet pipe was charged with 296 parts of phthalic anhydride, 404 parts of sebacic acid, 208 parts of neopentyl glycol, 241 parts of N-(3-sulfopropyl)-N-methyl-N,N-bis(2-hydroxyethyl)ammonium betaine and 34.5 parts of xylene. The mixture was reacted at 210° C. while removing water azeotropically until an acid number of 170 was reached. Thereafter, 500 parts of CARDURA E-10 (glycidyl versatate, sold by Shell Chem. Co.) were reacted at 140° C. for 2 hours.

A betaine group-containing polyester resin having an acid number of 52 and a number average molecular weight of 1350 was obtained.

EXAMPLE 1

A one liter flask having stirring means, temperature control means and condenser was charged with 334 parts of deionized water and heated to 80° C.

To a solution of 39.1 parts of acrylic resin prepared in Reference Example 1 dissolved in 214 parts of deionized water was added with stirring a separately prepared monomer mixture consisting of 60 parts of methyl methacrylate, 44 parts of styrene, 58 parts of n-butyl acrylate, 14 parts of 2-hydroxyethyl methacrylate and 24 parts of ethylene glycol dimethacrylate to prepare a pre-emulsion.

An initiator solution was separately prepared by dissolving 3 parts of azobiscyanovaleric acid in 50 parts of deionized water containing 2 parts of dimethylethanolamine.

After having confirmed the inner temperature of the flask to be 80° C., the above pre-emulsion and initiator solution were added dropwise concurrently requiring 90 minutes and 110 minutes, respectively. The reaction was continued for additional 60 minutes at the same temperature to bring completion. The resulting dispersion of polymer microparticles had a nonvolatile content of 28.2% and an average particle size of 120 nm.

EXAMPLE 2

The procedure of Example 1 was followed except that 37.1 parts of betaine group-containing polyester resin prepared in Reference Example 2 and 3.7 parts of dimethylethanolamine were used instead of betaine group-containing acrylic resin of Reference Example 1.

The resulting dispersion of polymer microparticles had a nonvolatile content of 28.0% and an average particle size of 85 nm.

EXAMPLE 3

The procedure of Example 1 was followed except that 200 parts of 1,6-hexanediol dimethacrylate were used instead of the monomer mixture used therein.

The resulting dispersion of polymer microparticles had a nonvolatile content of 28.1% and an average particle size of 110 nm.

EXAMPLE 4

A one liter flask having stirring means, temperature control means and condenser was charged with 425 parts of deionized water and heated to 80° C.

16 parts of N-(3-sulfopropyl)-N-methacryloyloxyethyl-N,N-dimethylammonium betaine were dissolved in 60 parts of deionized water.

A monomer mixture was separately prepared by mixing parts of styrene, 36 parts of n-butyl acrylate, 8 parts of 2-hydroxyethyl methacrylate and 120 parts of 1,6-hexanediol dimethacrylate.

An initiator solution was separately prepared by dissolving 3 parts of azobiscyanovaleric acid in 50 parts of water containing 2 parts of dimethylethanolamine.

After having confirmed the inner temperature of the flask to be 80° C., the above betaine solution, monomer mixture and initiator solution were added dropwise concurrently over 90 minutes, 90 minutes and 110 minutes, respectively. The reaction was continued for additional 60 minutes at the same temperature to bring completion.

The resulting dispersion of polymer microparticles had a nonvolatile content of 26.8% and an average particle size of 210 nm.

EXAMPLE 5

A one liter flask having stirring means, temperature control means and condenser was charged with 365 parts of deionizied water and heated to 80° C.

30 parts of 1-(3-sulfopropyl)-2-vinyl-pyridinium betaine were dissolved in 120 parts of deionized water.

A monomer mixture was separately prepared by mixing 10 parts of methyl methacrylate, 20 parts of n-butyl acrylate and 140 parts of neopentyl glycol dimethacrylate.

An initiator solution was separately prepared by dissolving 3 parts of azobiscyanovaleric acid in 50 parts of deionizied water containing 2 parts of dimethylethanolamine.

After having confirmed the inner temperature of the flask to be 80° C., the above betaine solution, monomer mixture and initiator solution were added dropwise concurrently over 90 minutes, 90 minutes and 110 minutes, respectively. The reaction was continued for additional 60 minutes at the same temperature to bring completion.

The resulting dispersion of polymer microparticles had a nonvolatile content of 26.7% and an average particle size of 250 nm.

We claim:

1. In internally crosslinked polymer microparticles having an average particle size of 0.01 to 1 micron and produced by emulsion polymerization of a monomer composition containing at least 10 % by weight of the composition of a polyfunctional monomer having a plurality of ethylenically unsaturated bonds in the molecule selected from the group consisting of esters of a polyhydric alcohol with an ethylenically unsaturated monocarboxylic acid, esters of ethylenically unsaturated monoalcohol with a polycarboxylic acid and aromatic compounds, having at least two vinyl substituents, the improvement wherein the emulsion polymerization of said monomer composition is conducted in an aqueous medium in the presence of a reactive betaine group-containing emulsifier compound being selected from the group consisting of:

3-(N,N-dimethyl-N-methacryloylethyl)aminopropane-sulfonic acid betaine,
3-(N,N-diethyl-N-methacryloylethyl)aminopropane-sulfonic acid betaine,
3-(N,N-dimethyl-N-acryloylethyl)-aminopropanesulfonic acid betaine,
3-(N,N-diethyl-N-acryloylethyl)-aminopropanesulfonic acid betaine,
N,N-dimethyl-N-methacryloylethyl-β-alanine betaine,
N,N-diethyl-N-methacryloylethyl-β-alanine betaine,
N,N-dimethyl-N-acryloylethyl-β-alanine betaine,
N,N-diethyl-N-acryloylethyl-β-alanine betaine,
3-(4-vinylpyridin-1-yl)-propanesulfonic acid betaine,
3-(2-vinylpyridin-1-yl)-propanesulfonic acid betaine,
3-(4-vinylpyridin-1-yl)-propionic acid betaine, and
3-(2-vinylpyridin-1-yl)-propionic acid betaine, and wherein said betaine group-containing emulsifier compound is covalently bonded to the polymer microparticles by copolymerization with said monomer composition.

2. The internally crosslinked polymer microparticles of claim 1, wherein said betaine compound is 3-(N,N-dimethyl-N-methacryloylethyl)aminopropane-sulfonic acid betaine.

3. The internally crosslinked polymer microparticles of claim 1, wherein said betaine compound is 3-(2-vinyl-pyridin-1-yl)-propanesulfonic acid betaine.

4. The internally crosslinked polymer microparticles of claim 1, wherein said monomer composition contains the balance of a monofunctional monomer having an ethylenically unsaturated group.

* * * * *